(12) United States Patent
Fujinaga et al.

(10) Patent No.: US 12,009,538 B2
(45) Date of Patent: Jun. 11, 2024

(54) BATTERY SYSTEM, VEHICLE INCLUDING BATTERY SYSTEM, AND POWER STORAGE DEVICE

(71) Applicant: SANYO Electric Co., Ltd., Osaka (JP)

(72) Inventors: Koji Fujinaga, Hyogo (JP); Kengo Ishibashi, Hyogo (JP); Shinichi Mitsubori, Kanagawa (JP)

(73) Assignee: SANYO Electric Co., Ltd., Osaka (JP)

( * ) Notice: Subject to any disclaimer, the term of this patent is extended or adjusted under 35 U.S.C. 154(b) by 799 days.

(21) Appl. No.: 17/266,159

(22) PCT Filed: Jul. 26, 2019

(86) PCT No.: PCT/JP2019/029346
§ 371 (c)(1),
(2) Date: Feb. 5, 2021

(87) PCT Pub. No.: WO2020/054230
PCT Pub. Date: Mar. 19, 2020

(65) Prior Publication Data
US 2021/0313645 A1 Oct. 7, 2021

(30) Foreign Application Priority Data
Sep. 14, 2018 (JP) ................................ 2018-172255

(51) Int. Cl.
*H01M 50/233* (2021.01)
*H01M 50/209* (2021.01)

(52) U.S. Cl.
CPC ....... *H01M 50/233* (2021.01); *H01M 50/209* (2021.01); *H01M 2220/10* (2013.01); *H01M 2220/20* (2013.01)

(58) Field of Classification Search
CPC .......................... H01M 50/233; H01M 50/209
See application file for complete search history.

(56) References Cited

U.S. PATENT DOCUMENTS

| 2013/0017436 A1 | 1/2013 | Kume |
| 2013/0273404 A1 | 10/2013 | Ochi et al. |
| 2019/0341644 A1* | 11/2019 | Carlstrom, Jr. ..... H01M 8/0254 |

FOREIGN PATENT DOCUMENTS

| JP | 2013-020855 | 1/2013 |
| JP | 2014-232664 | 12/2014 |
| WO | 2012/057322 | 5/2012 |

OTHER PUBLICATIONS

International Search Report of PCT application No. PCT/JP2019/029346 dated Oct. 8, 2019.

* cited by examiner

*Primary Examiner* — Karie O'Neill Apicella
(74) *Attorney, Agent, or Firm* — WHDA, LLP

(57) ABSTRACT

A battery system includes: a battery stack including a plurality of rectangular battery cells that are stacked; end plate placed at both ends of the battery stack; and a binding bar that connects the end plates to fix the battery stack in a compressed state. End plate includes plates placed on both surfaces and plate-shaped block laminated between plates; plates include outer plate and inner plate; plate-shaped block includes dual-side blocks placed on both sides so as to be separated from each other and intermediate block placed in tapered groove between dual-side blocks; the tapered groove has a taper shape that gradually increases in width from an outside to an inside of the end plate. The intermediate block is placed in facing surfaces of the tapered groove in a slidable manner; the dual-side blocks are fixed to the plates; and intermediate block pressed by battery stack is press-fitted into tapered groove and end plate applies tensile stress to outer plate and inner plate via dual-side blocks.

12 Claims, 7 Drawing Sheets

BATTERY SYSTEM, VEHICLE INCLUDING BATTERY SYSTEM, AND POWER STORAGE DEVICE

CROSS-REFERENCE TO RELATED APPLICATIONS

This application is a U.S. national stage application of the PCT International Application No. PCT/JP2019/029346 filed on Jul. 26, 2019, which claims the benefit of foreign priority of Japanese patent application No. 2018-172255 filed on Sep. 14, 2018, the contents all of which are incorporated herein by reference.

TECHNICAL FIELD

The present invention relates to a battery system including a large number of battery cells which are stacked, and a vehicle and a power storage device provided with the battery system.

BACKGROUND ART

A typical battery system includes a battery stack including a plurality of rectangular battery cells, a pair of end plates placed on both end faces of the battery stack, and a binding bar connecting the pair of end plates (see PTL 1). In this battery system, the battery stack is bound with the end plates and the binding bar, by which expansion of the rectangular battery cells constituting the battery stack can be suppressed.

On the other hand, in recent years, a battery system having high energy density per volume and high energy density per weight has been demanded, and rectangular battery cells constituting the battery system are also required to have high energy density per volume and high energy density per weight.

CITATION LIST

Patent Literatures

PTL 1: WO 2012/057322 A
PTL 2: Unexamined Japanese Patent Publication No. 2014-232664
PTL 3: Unexamined Japanese Patent Publication No. 2013-020855

SUMMARY OF THE INVENTION

When a rectangular battery cell is constructed to have higher energy density per volume and higher energy density per weight, it tends to be greatly varied in size due to charging, discharging, and deterioration. In order to suppress expansion of the rectangular battery cell having a great variation in size due to charging, discharging, and deterioration, it is necessary to bind the rectangular battery cell with relatively large force. Therefore, in this type of battery system, cell reaction force exerted on end plates increases, resulting in that the end plates may deform. If end plates having insufficient flexural rigidity deform by being pressed by the strong cell reaction force, the relative positions of the plurality of stacked rectangular battery cells may be changed. The relative movement of the battery cells causes damage to a connection portion between a bus bar such as a metal plate and an electrode terminal.

The present invention has been developed for the purpose of solving the above problems, and one of the objects of the present invention is to provide a technique capable of achieving excellent flexural rigidity while employing a simple structure for an end plate.

A battery system according to one aspect of the present invention includes: a battery stack including a plurality of rectangular battery cells that are stacked; a pair of end plates placed at both ends of the battery stack; and a binding bar that connects the end plates so as to fix the battery stack in a compressed state in a stacking direction. Each of the end plates includes plates placed on both surfaces, and a plate-shaped block laminated between the plates, wherein the plates include an outer plate placed on an outer surface and an inner plate placed on an inner surface, the plate-shaped block includes dual-side blocks placed on both sides so as to be separated from each other, and an intermediate block provided in a tapered groove between the dual-side blocks, the tapered groove has a taper shape that gradually increases in width from an outside to an inside of the end plate, the intermediate block is placed in close contact with facing surfaces of the tapered groove in a slidable manner, the dual-side blocks are fixed on inner surfaces of the plates, and the intermediate block pressed by the battery stack is press-fitted into the tapered groove and applies tensile stress to the outer plate and the inner plate via the dual-side blocks.

Further, a vehicle equipped with a battery system having the components according to the above aspect includes: the battery system mentioned above; a traveling motor supplied with electric power from the battery system; a vehicle body equipped with the battery system and the traveling motor; and a wheel driven by the traveling motor to cause the vehicle body to travel.

Further, a power storage device equipped with a battery system having the components according to the above aspect includes: the battery system; and a power supply controller that controls charging and discharging of the battery system, wherein the power supply controller enables charging of the rectangular battery cells by external power, and causes charging of the battery cells.

The battery system described above has a feature of achieving excellent flexural rigidity while reducing the weight of the end plates. This is because each of the end plates of the above battery system converts strong pressing force applied to the inner surface due to the expansion of the battery stack fixed in a compressed state into tensile stress on the plates provided on both surfaces of the end plate.

DESCRIPTION OF EMBODIMENT

Figure 1:
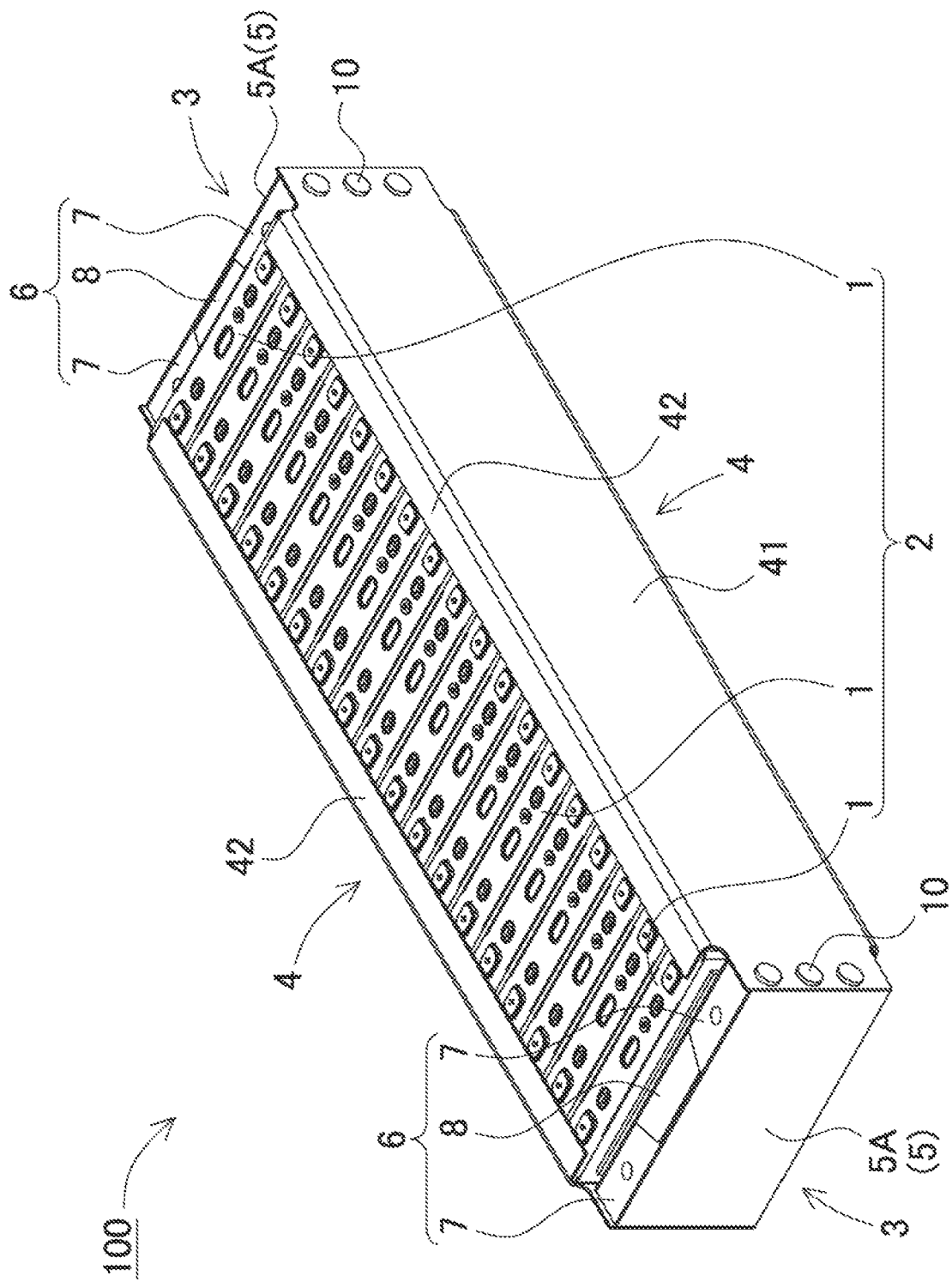
FIG. 1 is a perspective view showing a battery system according to an exemplary embodiment of the present invention.

First, one aspect of the present invention will be described. In a battery system including a large number of rectangular battery cells, end plates are placed on both end faces of a battery stack including a plurality of rectangular battery cells that are stacked, and the pair of end plates are connected using a binding bar so as to fix the battery stack in a compressed state in a stacking direction. In this battery system, both ends of the battery stack are fixed in a compressed state with the pair of end plates. Therefore, the end plates are required to have sufficient strength. The end plates receive cell reaction force from inner surfaces due to expansion of the rectangular battery cells that are charged and discharged. Since the end plates are pressed from inner surfaces by the expanding battery stack, they receive cell reaction force proportional to the product of the area of the battery stack and the pressure applied by the battery stack. Therefore, the end plates receive cell reaction force having magnitude according to an amount of expansion of the rectangular battery which is greatly varied in size due to charging, discharging, or the like.

In particular, in a large-capacity, high-output battery system that supplies electric power to a traveling motor of a vehicle, battery cells are fixed with extremely strong pressure. In this battery system, end plates placed on both end faces of the battery stack are strongly pressed by a press machine, and a binding bar is secured to the pair of end plates with the battery stack being held in a compressed state. Further, in this battery system, when the battery cells expand by charging and discharging, the pressing force acting on the end plates may be significantly increased to several tons. The end plates that press the stacked battery cells with pressing force of several tons is required to have extremely high flexural rigidity.

When each of the end plates has insufficient flexural rigidity, the end plate deforms when pressed by strong cell reaction force. The deformed end plate causes a change in the relative position between the rectangular battery cells fixed in a compressed state. The rectangular battery cells are connected in series or in parallel via bus bars which are thick metal plates and fixed to electrode terminals. Thus, when the relative position varies, unnecessary distortion force may occur on a connection portion between the electrode terminal and the bus bar. The distortion force causes damage to the connection portion between the electrode terminal and the bus bar, and also causes damage to a connection portion between the electrode terminal and an outer case of each of the rectangular battery cells.

In order to increase flexural rigidity of end plates, end plates having various structures have been developed. An end plate disclosed in PTL 2 is formed by alternately laminating thin metal plates and metal plates having a modified cross section. Each of the metal plates having a modified cross section has, for example, a honeycomb structure to increase flexural rigidity. This end plate is formed by alternately laminating metal plates having modified cross section which exhibit excellent flexural rigidity and metal thin plates in order to improve flexural rigidity of the whole end plate. With this structure, the flexural rigidity of this end plate can be increased due to the metal plates having modified cross section. However, the overall structure is complicated, which entails a problem of an increase in production cost. An end plate disclosed in PTL 3 is reinforced by a reinforcing rib which extends vertically and horizontally and is integrally provided on an outer surface of a metal plate. This end plate is disadvantageous in that it is thick and heavy due to the reinforcing rib provided on the outer surface.

As described above, the end plate is required to be lightweight and have high strength, but a reduction in weight and an increase in strength are contradictory features, and it is extremely difficult to achieve both features. In view of the above circumstances, it is important to study a structure that can achieve excellent flexural rigidity while employing a simple structure for the end plate.

A battery system according to an aspect of the present invention may be specified by the following configuration. The battery system includes: battery stack 2 including a plurality of rectangular battery cells 1 that are stacked; a pair of end plates 3 placed at both ends of battery stack 2; and binding bar 4 that connects end plates 3 so as to fix battery stack 2 in a compressed state in a stacking direction. Each of end plates 3 includes plates 5 placed on both surfaces and plate-shaped block 6 laminated between plates 5. Plates 5 include outer plate 5A provided on an outer surface and inner plate 5B provided on an inner surface. Plate-shaped block 6 includes dual-side blocks 7 placed on both sides so as to be separated from each other, and intermediate block 8 provided in tapered groove 9 between dual-side blocks 7, and tapered groove 9 has a taper shape that gradually increases in width from an outside to an inside of end plate 3. In end plate 3, intermediate block 8 is placed in close contact with facing surfaces 9A of tapered groove 9 in a slidable manner, dual-side blocks 7 are fixed on inner surfaces of plates 5, and intermediate block 8 pressed by battery stack 2 is press-fitted into tapered groove 9 and applies tensile stress to outer plate 5A and inner plate 5B via dual-side blocks 7.

The end plates of the above battery system have a feature of converting pressing force due to expansion of the battery stack fixed in a compressed state into tensile stress on the plates provided on both surfaces of each end plate. Thus, the end plates achieve excellent flexural rigidity. The end plates placed at both ends of the battery stack and fixing the battery stack in a compressed state are deflected when pressed from the inner surface by strong force due to expansion of the battery stack. In the deflected end plate, tensile force is exerted on the outer surface, compressive force is exerted on the inner surface, and neither the tensile force nor the compressive force is exerted on the central portion, because the central portion does not expand or contract. When the thick end plate is deflected, the elongation of the outer surface and the inner surface increases, and the tensile stress on the outer surface and the compressive stress on the inner surface increase, but in the central portion that does not expand and contract, the tensile stress and the compressive stress decrease. Therefore, in the central portion of the end plate in the thickness, an action for achieving the rigidity is low, and in order to achieve sufficient rigidity, the end plate needs to be considerably increased in thickness, which may increase the weight.

In the end plate of the above battery system, a pair of plates including an inner plate and an outer plate are provided on the surfaces, and a plate-shaped block is placed between the inner plate and the outer plate. The plate-shaped block includes dual-side blocks on both sides, a tapered groove formed between the dual-side blocks, and an intermediate block placed in the tapered groove. The outer plate and the inner plate are fixed to the surfaces of the dual-side blocks, and the tapered groove has a taper shape that gradually increases in width from an outside to an inside of the end plate. The intermediate block is placed in close contact with facing surfaces of the tapered groove in a slidable manner. The intermediate block pressed by the battery stack via the inner plate is press-fitted into the tapered groove. When the intermediate block is pressed against the tapered groove, the dual-side blocks are moved away from each other. When the pair of dual-side blocks move away from each other, tensile stress acts on the outer plate and the inner plate fixed on both surfaces. The above-mentioned end plate has a feature in which, when the battery stack presses the inner surface, tensile stress acts on both the outer plate and the inner plate, so that the flexural rigidity of the end plate can be increased with the pair of plates. In particular, when a metal plate having high tensile stress is used for the plates on both surfaces, and a light metal block, plastic, etc. is used for the plate-shaped block, the end plate that achieves sufficient flexural rigidity with a pair of plates can achieve sufficient flexural rigidity while attaining reduction in weight.

The end plate may be provided with gap 31 between an inner surface of outer plate 5A and intermediate block 8. With this configuration, the intermediate block can be smoothly press-fitted into the tapered groove, and the pressing force of the battery stack can be efficiently converted into the tensile stress of the plates.

Further, in end plate 3, tapered groove 9 preferably has inclination angle (α) of 5 degrees or more. Further, in end plate 3, tapered groove 9 preferably has inclination angle (α) of 45 degrees or less.

Further, in end plate 3, it is preferable that plate-shaped block 6 is thicker than each of plates 5. With this configuration, the pressing force of the battery stack can be efficiently converted into the tensile stress of the plates, whereby the flexural rigidity of the end plates can be further improved. The reason is as follows. When the plate-shaped block is thick, inclination angle (α) of the tapered groove can be decreased. Thus, the friction resistance between the tapered groove and the intermediate block can be decreased, whereby the intermediate block can be smoothly press-fitted into the tapered groove, and tensile stress is applied to the plates. Accordingly, the flexural rigidity can be increased. Further, when the plate-shaped block is thick, a difference in width between openings of the tapered groove can be increased. Therefore, the intermediate block can be deeply press-fitted into the tapered groove with the end plate being deflected, whereby an amount of elongation of the inner plate can be increased. The tensile stress increases, as the amount of elongation of the inner plate increases. From the above, when the intermediate block is deeply press-fitted into the tapered groove with the end plate being deflected, the tensile stress of the inner plate increases with slight deflection, whereby the flexural rigidity of the end plate can be further increased with the tensile stress of the inner plate.

Further, in end plate 3, plates 5 and dual-side blocks 7 may be made of metal, and plates 5 and dual-side blocks 7 may be fixed by welding. With this configuration, the dual-side blocks and the plates can be tightly fixed to each other readily and easily, so that the pressing force of the battery stack acting on the inner surfaces of the end plates is stably supported by the tensile stress of the plates. Thus, the flexural rigidity of the end plates can be increased.

In the battery system, binding bar 4 may be secured to plate-shaped block 6. Further, in the battery system, dual-side blocks 7 of end plates 3 may be formed with fixing holes 32 penetrating in the vertical direction.

Further, in the battery system, it is preferable that opening width (W) of tapered groove 9 facing inner plate 5B is 30% or more of total width (H) of end plate 3. With this configuration, the pressing force of the battery stack can be efficiently converted into the tensile stress of the plates, whereby the flexural rigidity of the end plates can be further improved. This is because, when the width of the intermediate block on the inner surface side is increased, the battery stack can press the intermediate block over a wide area, so that the intermediate block is press-fitted into the tapered groove.

Further, in the battery system, each of rectangular battery cells 1 may be a non-aqueous electrolyte secondary battery.

The present invention will now be described in detail with reference to the drawings. In the following description, terms indicating a specific direction or position (for example, "upper", "lower", and other terms including those terms) are used as necessary, but they are used merely for facilitating the understanding of the invention with reference to the drawings, and are not intended to limit the technical scope of the present invention by the meaning thereof. Further, the parts having the same reference marks appearing in a plurality of drawings indicate the same or equivalent parts or members.

Furthermore, the exemplary embodiment described below is a specific example of the technical idea of the present invention, and the present invention is not limited to the exemplary embodiment below. In addition, the sizes, materials, and shapes of the components described below, and relative arrangement between the components do not limit the scope of the present invention but are merely illustrative examples unless otherwise specified. Further, the descriptions of one exemplary embodiment and example are applicable to other exemplary embodiments and examples. The sizes and the positional relation of the members in each drawing are sometimes exaggerated for facilitating the understanding of the description.

Figure 2:
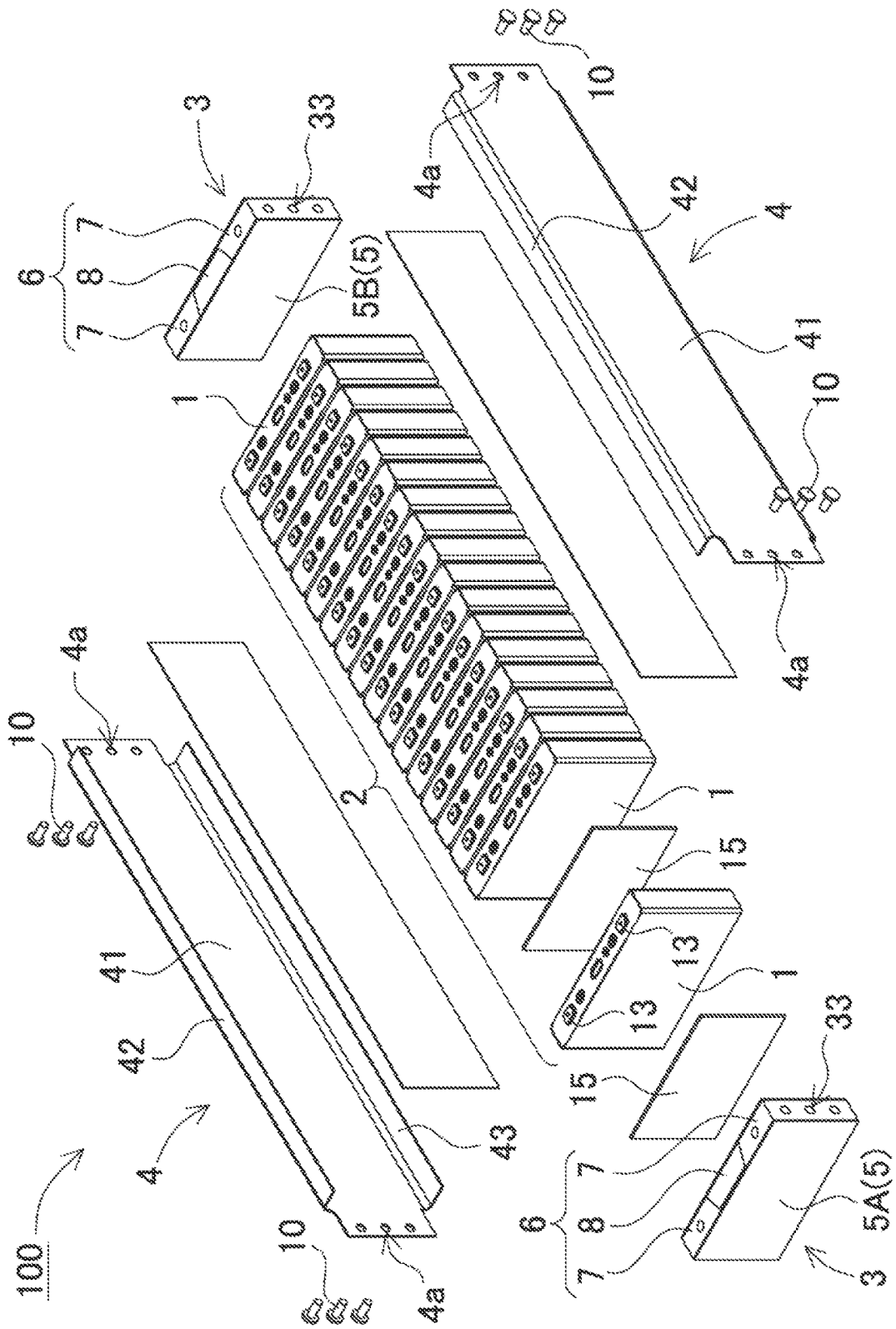
FIG. 2 is an exploded perspective view of the battery system shown in FIG. 1.
Figure 3:
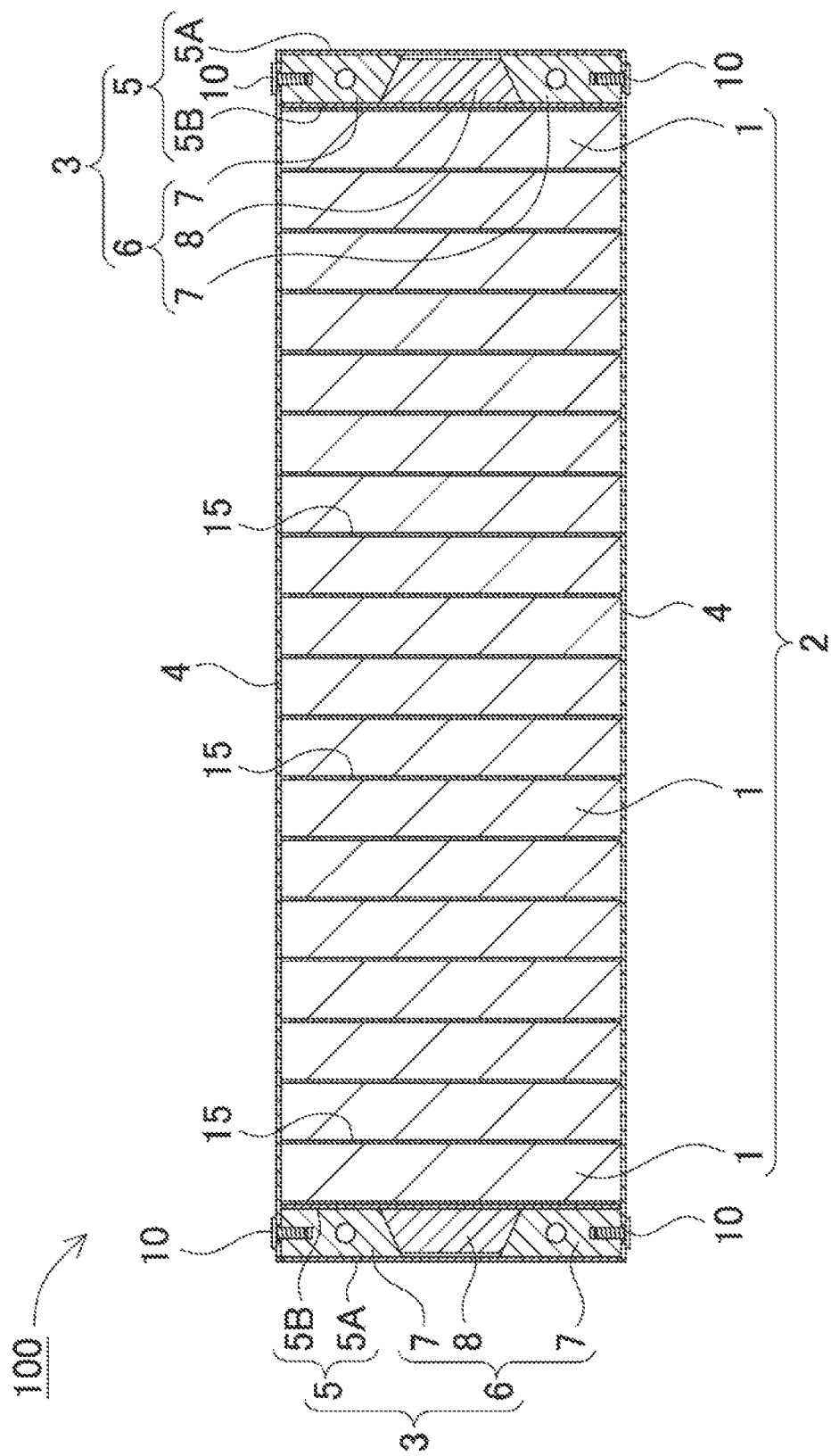
FIG. 3 is a horizontal sectional view of the battery system shown in FIG. 1.

FIGS. 1 to 3 show, as a battery system according to one exemplary embodiment of the present invention, battery system 100 that is mounted on an electric vehicle such as a hybrid car, a plug-in hybrid car, and an electric car, and that supplies power to a traveling motor of the vehicle to drive the vehicle. Battery system 100 shown in FIGS. 1 to 3 includes: battery stack 2 including a plurality of rectangular battery cells 1 that are stacked; a pair of end plates 3 placed at both ends of battery stack 2; and binding bars 4 that fix battery stack 2 in a compressed state with both ends being fixed to end plates 3. In this battery system 100, as shown in FIGS. 1 and 2, battery stack 2 formed by stacking the plurality of rectangular battery cells 1 is held by end plates 3 from both end faces in the stacking direction, and end plates 3 at both ends are connected using binding bars 4 so as to fix battery stack 2 in a compressed state. Thus, battery system 100 has a long box shape as a whole.

(Rectangular Battery Cell 1)

As shown in the figures, each of rectangular battery cells 1 has a width greater than the thickness, in other words, has a thickness smaller than the width. Rectangular battery cells 1 are stacked in the thickness direction to form battery stack 2. Each of rectangular battery cells 1 is a non-aqueous electrolyte secondary battery such as a lithium-ion secondary battery. Battery system 100 that uses lithium-ion secondary batteries as rectangular battery cells 1 can increase charging and discharging capacity with respect to volume and weight. However, rectangular battery cells 1 are not limited to lithium-ion batteries, and any rechargeable batteries such as nickel hydrogen batteries can also be used.

Each of rectangular battery cells 1 houses positive and negative electrode plates together with an electrolytic solution in an outer can having a closed structure. The outer can is formed by press-molding a metal plate made of aluminum, an aluminum alloy, or the like into a rectangular shape, and an opening is hermetically sealed with a sealing plate. The sealing plate is made of a material same as the material of the outer can such as aluminum or an aluminum alloy, and has positive and negative electrode terminals at both ends. Further, the sealing plate is provided with an opening of a gas discharge valve between the positive and negative electrode terminals. The gas discharge valve opens when an internal pressure of the rectangular battery cell 1 becomes higher than a set value, in order to prevent the outer can and the sealing plate from being damaged.

(Battery Stack 2)

The plurality of rectangular battery cells 1 are stacked to constitute battery stack 2 such that the thickness direction of each rectangular battery cell 1 is along the stacking direction. The plurality of rectangular battery cells 1 are stacked to constitute battery stack 2 such that terminal surfaces of rectangular battery cells 1 provided with positive and negative electrode terminals 13 are arranged on the same plane. In battery stack 2, a metal bus bar (not shown) is connected to positive and negative electrode terminals 13 of adjacent rectangular battery cells 1, and the plurality of rectangular battery cells 1 are connected in series or in parallel, or connected in series and in parallel, by the bus bars. In illustrated battery stack 2, 18 rectangular battery cells 1 are connected in series. However, the present invention does not specify a number of rectangular battery cells 1 constituting battery stack 2 and the connection state thereof.

(Separator 15)

As shown in FIG. 2, battery stack 2 includes separators 15 disposed between stacked rectangular battery cells 1 and between rectangular battery cell 1 at each end and end plate 3. Each of separators 15 is formed into a thin plate shape or sheet shape using an insulating material. Each of illustrated separators 15 has a plate shape having a size substantially equal to a facing surface of rectangular battery cell 1, and such separator 15 is interposed between adjacent rectangular battery cells 1 so that adjacent rectangular battery cells 1 are electrically isolated from each other. As the separator, a separator that forms a cooling-gas flow path between adjacent rectangular battery cells 1 can be used, and a cooling gas can be forcibly blown into the flow path to cool rectangular battery cell 1. In addition, the surface of each rectangular battery cell 1 can be coated with an insulating material. For example, the surface of the outer can except for the electrode portions of rectangular battery cells 1 may be heat-welded with a shrink tube made of, for example, a polyethylene terephthalate (PET) resin.

(End Plate 3)

End plates 3 are placed at both ends of battery stack 2, and sandwich battery stack 2 from both ends. The pair of end plates 3 placed at both ends of battery stack 2 are secured by being connected to binding bars 4 disposed along both side surfaces of battery stack 2. The pair of end plates 3 placed at both ends of battery stack 2 is connected to binding bars 4 to hold battery stack 2 in a compressed state, and therefore, receives cell reaction force due to expansion of rectangular battery cells 1. In the battery system according to the present invention, each of end plates 3 has a unique configuration in order to achieve flexural rigidity required to withstand the cell reaction force.

Figure 4:
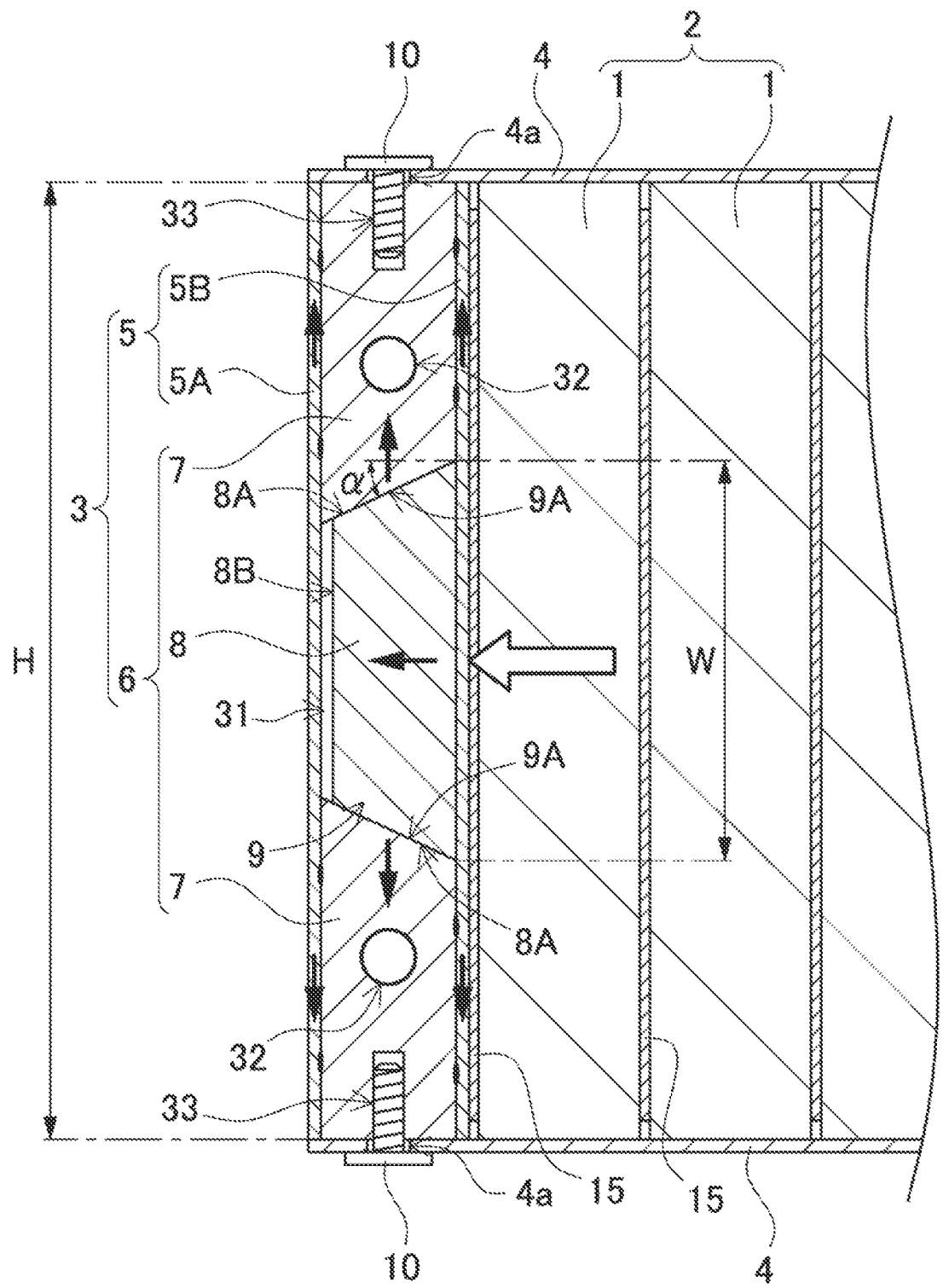
FIG. 4 is an enlarged sectional view of the battery system shown in FIG. 3, and shows a state in which pressing force of a battery stack acts on an end plate.

As shown in FIGS. 2 to 4, each of end plates 3 includes plates 5 provided on both surfaces and plate-shaped block 6 provided between plates 5. Plates 5 include outer plate 5A provided on an outer surface and inner plate 5B provided on an inner surface. Outer plate 5A and inner plate 5B are preferably metal plates. High-strength steel is suitable for plates 5 which are metal plates. Since high-strength steel has larger tensile strength than other metal plates, it achieves excellent tensile strength while being thin and lightweight. The thickness and material of plates 5 are optimally set in consideration of the flexural rigidity required for end plates 3. For example, a high-strength steel plate having a thickness of 2 mm to 3 mm is used for plates 5 in the battery system that supplies electric power to a traveling motor of a vehicle. However, the present invention does not specify plates 5 as metal plates such as high-strength steel plates. For example, a plate having excellent tensile strength such as a carbon fiber reinforced plastic plate can also be used as plates 5. The rigidity required for end plates 3 is set to an optimum value in consideration of the physical properties of rectangular battery cells 1, for example, expansion states of the battery cells to be charged and discharged. Therefore, the thickness of each plate 5 is set to an optimum value in consideration of the physical properties of the battery cells and the material of plates 5.

Plate-shaped block 6 includes dual-side blocks 7 which are placed on both sides of end plate 3 so as to be separated from each other, and intermediate block 8 placed in tapered groove 9 between dual-side blocks 7. Plates 5 are fixed to both outer and inner surfaces of dual-side blocks 7. In end plate 3 including plates 5 and dual-side blocks 7 which are made of metal, plates 5 and dual-side blocks 7 are fixed by welding. With this structure, dual-side blocks 7 and plates 5 can be tightly fixed readily and easily. Plates 5 and dual-side blocks 7 made of metal can be welded by spot welding at a plurality of locations in a region where they are joined to each other, for example. However, plates 5 and dual-side blocks 7 can be fixed using an adhesive, screws, an engagement structure, or a combination thereof. Outer plate 5A is fixed to the outer surfaces of dual-side blocks 7, and inner plate 5B is fixed to the inner surfaces of dual-side blocks 7.

Plate-shaped block 6 has a plate shape that is thicker than plates 5. In plate-shaped block 6, intermediate block 8 is placed in tapered groove 9 provided between dual-side blocks 7. Tapered groove 9 of plate-shaped block 6 has a taper shape that gradually increases in width from an outside to an inside of end plate 3, in other words, from the outer surface facing outer plate 5A to the inner surface facing inner plate 5B. Intermediate block 8 is placed in close contact with tapered facing surfaces 9A of tapered groove 9 in a slidable manner. Intermediate block 8 has a horizontal cross-sectional shape of an isosceles trapezium, and both side surfaces thereof are tapered inclined surfaces 8A along facing surfaces 9A of tapered groove 9. Inclined surfaces 8A on both sides of intermediate block 8 and facing surfaces 9A of tapered groove 9 are smooth sliding surfaces so that they can smoothly slide over each other.

In end plate 3 described above, when pressing force from battery stack 2 acts on the inner surface side, inner plate 5B is pressed by battery stack 2, and intermediate block 8 is pressed outward via inner plate 5B, as shown in FIG. 4. Intermediate block 8 pressed outward is pushed into tapered groove 9 and expands the pair of dual-side blocks 7 in a direction away from each other. Inner plate 5B and outer plate 5A fixed to expanded dual-side blocks 7 are urged in the tensile direction by intermediate block 8, so that tensile stress acts on them.

In end plate 3 described above, tensile stress acts on both outer plate 5A and inner plate 5B due to the pressing force from battery stack 2. The deformation of end plate 3 that occurs when end plate 3 is pressed by battery stack 2 is suppressed by the tensile stress exerted on both plates 5, that is, outer plate 5A and inner plate 5B. Since the flexure of end plate 3 is restricted by plates 5 on both surfaces, deformation of end plate 3 can be prevented using plates 5 having excellent tensile strength. Plate-shaped block 6 functions as a member that expands dual-side blocks 7 and converts the flexural stress of end plate 3 into tensile stress exerted on plates 5 on both surfaces. Therefore, a light material, such as aluminum or hard plastic, having lower strength than plates 5 can be used for plate-shaped block 6. As described above, end plate 3 including plate-shaped block 6 which is made of a light material and plates 5 which are metal plates and are provided on both surfaces of plate-shaped block 6 can achieve excellent flexural rigidity with reduced weight as a whole.

In end plate 3, plate-shaped block 6 is thicker than plates 5, and the thickness thereof is 5 mm or more, preferably 10 mm or more. When plate-shaped block 6 is thick, the contact area between facing surfaces 9A of tapered groove 9 and inclined surfaces 8A of intermediate block 8 can be increased. Thus, plate-shaped block 6 including dual-side blocks 7 and intermediate block 8 which are connected to each other can be stably held in a plate shape. Further, when plate-shaped block 6 is thick, a difference in width between openings of tapered groove 9 can be increased, whereby an amount of elongation of inner plate 5B can be increased by pressing intermediate block 8 deeply into tapered groove 9 in a state where end plate 3 receives flexural stress by being pressed by battery stack 2. The tensile stress increases, as the amount of elongation of inner plate 5B increases. Therefore, in end plate 3 in which intermediate block 8 is pressed and deeply fitted into tapered groove 9 due to the flexural stress, the tensile stress of inner plate 5B increases by slight deflection, so that the flexural rigidity of end plate 3 can be further increased due to tensile stress of inner plate 5B.

Further, when plate-shaped block 6 is thick, inclination angle (a) of tapered groove 9 can be reduced, by which the frictional resistance between tapered groove 9 and intermediate block 8 can be decreased. Here, inclination angle (a) of tapered groove 9 indicates an angle between facing surface 9A of tapered groove 9 and the stacking direction (longitudinal direction of the battery stack) of rectangular battery cells 1 in the horizontal cross section of end plate 3. When inclination angle (a) of tapered groove 9 of end plate 3 is reduced, the frictional resistance between tapered groove 9 and intermediate block 8 can be reduced, so that intermediate block 8 can be easily press-fitted into tapered groove 9, whereas the expansion amount of the pair of dual-side blocks 7 in the direction away from each other is decreased relative to the press-fit amount of intermediate block 8. On the other hand, when inclination angle (a) of tapered groove 9 is increased, the expansion amount of the pair of dual-side blocks 7 with respect to the press-fit amount of intermediate block 8 press-fitted into tapered groove 9 increases, whereas the friction resistance between tapered groove 9 and intermediate block 8 increases, which makes it difficult to press-fit intermediate block 8 into tapered groove 9. Therefore, inclination angle (a) of tapered groove 9 of end plate 3 is determined to be an optimum angle in consideration of these factors. Inclination angle (a) of tapered groove 9 of end plate 3 is set to be 5 degrees to 45 degrees, preferably 10 degrees to 45 degrees.

Furthermore, in end plate 3, opening width (W) of tapered groove 9 facing inner plate 5B is set wider, whereby battery stack 2 can press intermediate block 8 over a wide area, and thus, intermediate block 8 can be effectively press-fitted into tapered groove 9. Therefore, in end plate 3, opening width (W) of tapered groove 9 can be widened, as long as dual-side blocks 7 and plates 5 are reliably fixed with a sufficient contact area between them. Opening width (W) of tapered groove 9 facing inner plate 5B can be, for example, 30% or more of total width (H) of end plate 3. In illustrated end plate 3, opening width (W) of tapered groove 9 facing inner plate 5B is about 40% of total width (H) of end plate 3. With this configuration, the pressing force of battery stack 2 can be efficiently converted into the tensile stress on plates 5, so that the flexural rigidity can be increased.

Further, end plate 3 shown in FIG. 4 has gap 31 between the inner surface of outer plate 5A and intermediate block 8. Since gap 31 is formed between intermediate block 8 and outer plate 5A in end plate 3, tip surface 8B of intermediate block 8 is not in contact with outer plate 5A. This structure prevents tip surface 8B of intermediate block 8 press-fitted into tapered groove 9 from coming into contact with outer plate 5A, and thus, enables smooth press-fitting of intermediate block 8 into tapered groove 9. Further, since outer plate 5A is placed without being in contact with intermediate block 8, direct application of pressing force of battery stack 2 to outer plate 5A can be prevented. That is, it is possible to prevent generation of flexural stress on outer plate 5A due to intermediate block 8 pressing the central portion of outer plate 5A.

Further, as shown in FIG. 1, end plates 3 are slightly lower than rectangular battery cells 1 in the vertical direction, and end plates 3 do not face upper ends and lower ends of rectangular battery cells 1. This configuration prevents the upper ends of rectangular battery cells 1 on the sealing plate side or portions facing the bottom of the outer can from being strongly pressed due to reaction force of end plates 3 pressed by the cell reaction force. This is to prevent damage to the bottom of the outer can and a joint portion between the sealing plate that closes the opening of the outer can of rectangular battery cells 1 and the outer can.

Furthermore, illustrated end plate 3 has fixing holes 32 penetrating in the vertical direction in dual-side blocks 7. Battery system 100 can be fixed to a base plate (not shown) via fixing bolts (not shown) inserted into fixing holes 32 provided in dual-side blocks 7. This structure has a feature in which the battery system can be tightly fixed to the base plate. Further, the weight of each end plate 3 can be reduced by opening fixing holes 32 in dual-side blocks 7.

As shown in FIG. 2, end plates 3 having the above configuration are placed at both ends of battery stack 2, and a pair of binding bars 4 placed on both sides of battery stack 2 are connected to end plates 3. Ends of binding bars 4 are fixed to end plates 3. Binding bars 4 are fixed to plate-shaped blocks 6 of end plates 3 via set screws 10. In illustrated battery system 100, binding bars 4 are fixed to both side surfaces of dual-side blocks 7 of end plates 3 via set screws 10. However, binding bars 4 can also be fixed to end plates 3 such that ends of binding bars 4 are bent to form bent pieces, and the bent pieces are fixed to end plates 3. End plates 3 to which binding bars 4 are secured with set screws 10 have female screw holes 33 into which set screws 10 are screwed in side surfaces of dual-side blocks 7. Binding bars 4 are connected to end plates 3 in such a way that set screws 10 penetrating binding bars 4 are screwed to female screw holes 33 in dual-side blocks 7.

(Binding Bar 4)

Side surfaces of battery stack 2 are covered with a pair of binding bars 4, and end plates 3 are secured to each other by binding bars 4 on side surfaces of battery stack 2. As shown in FIGS. 1 and 2, binding bars 4 extend in the stacking direction of battery stack 2, and both ends thereof are fixed to dual-side blocks 7 of end plates 3. Thus, binding bars 4 bind battery stack 2 in the stacking direction via end plates 3. Each of binding bars 4 is manufactured by processing a metal plate having a predetermined thickness into a predetermined width. Binding bars 4 are fixed to end plates 3 at their ends, and fix battery stack 2 in a compressed state by a pair of end plates 3. Binding bars 4 fix rectangular battery cells 1 stacked between the pair of end plates 3 in a predetermined compressed state with end plates 3 being fixed to a predetermined size. If binding bars 4 extend by the expansion pressure of rectangular battery cells 1, the expansion of rectangular battery cells 1 cannot be prevented. Therefore, each of binding bars 4 is manufactured by processing a metal plate having strength required to withstand the expansion pressure of rectangular battery cells 1, for example, a plate made of stainless such as SUS304 or a metal plate such as a steel plate, into a width and thickness providing sufficient strength. Further, binding bar 4 can also be manufactured by processing a metal plate into a groove shape. Binding bar 4 having such a shape has increased flexural strength, and thus, has a feature of being capable of tightly binding stacked rectangular battery cells 1 in a predetermined compressed state, while having a decreased width.

Each of illustrated binding bars 4 has binding bar main surface 41 having a size capable of substantially covering the side surface of battery stack 2. Binding bar main surface 41 is formed in a flat plate shape up to the edge in the stacking direction of battery stack 2. Binding bars 4 have, as retaining holes 4a, through holes into which set screws 10 are inserted at both ends of binding bar main surfaces 41. Binding bar main surfaces 41 each have a rectangular shape having a size capable of almost entirely covering battery stack 2 and end plates 3 placed at both ends of battery stack 2. Binding bar main surfaces 41 shown in FIG. 1 cover almost the entire side surfaces of battery stack 2 without any gap. Note that the binding bar main surfaces may be provided with one or more openings so that a part of the side surface of battery stack 2 can be exposed. When the binding bar main surface has an opening, battery stack 2 can be exposed and air-cooled, or a cooling gas can be supplied. Note that, even when it is not necessary to supply a cooling gas to the binding bar main surface through the opening, the opening may be formed in the binding bar main surface. With this configuration, the weight of binding bars 4 can be reduced.

Further, each of illustrated binding bars 4 is provided with upper-surface-side bent portion 42 for holding the upper surface of battery stack 2 along the upper end of binding bar main surface 41 in an intermediate portion excluding both ends, and lower-surface-side bent portion 43 for holding the lower surface of battery stack 2 along the lower end in the intermediate portion.

(Vehicle Equipped with Battery System)

The battery system described above is most suitable as a power supply for supplying electric power to a motor that drives a vehicle. Examples of a vehicle equipped with the battery system include a hybrid vehicle or a plug-in hybrid vehicle that travels using both an engine and a motor, and an electric vehicle that travels using only a motor. The battery system is used as a power supply for these vehicles. Note that, in order to obtain electric power for driving a vehicle, the vehicle can be equipped with a large-capacity high-output power supply device constructed by connecting a large number of battery systems described above in series or in parallel and additionally providing a necessary control circuit.

(Battery System for Hybrid Vehicle)

Figure 5:
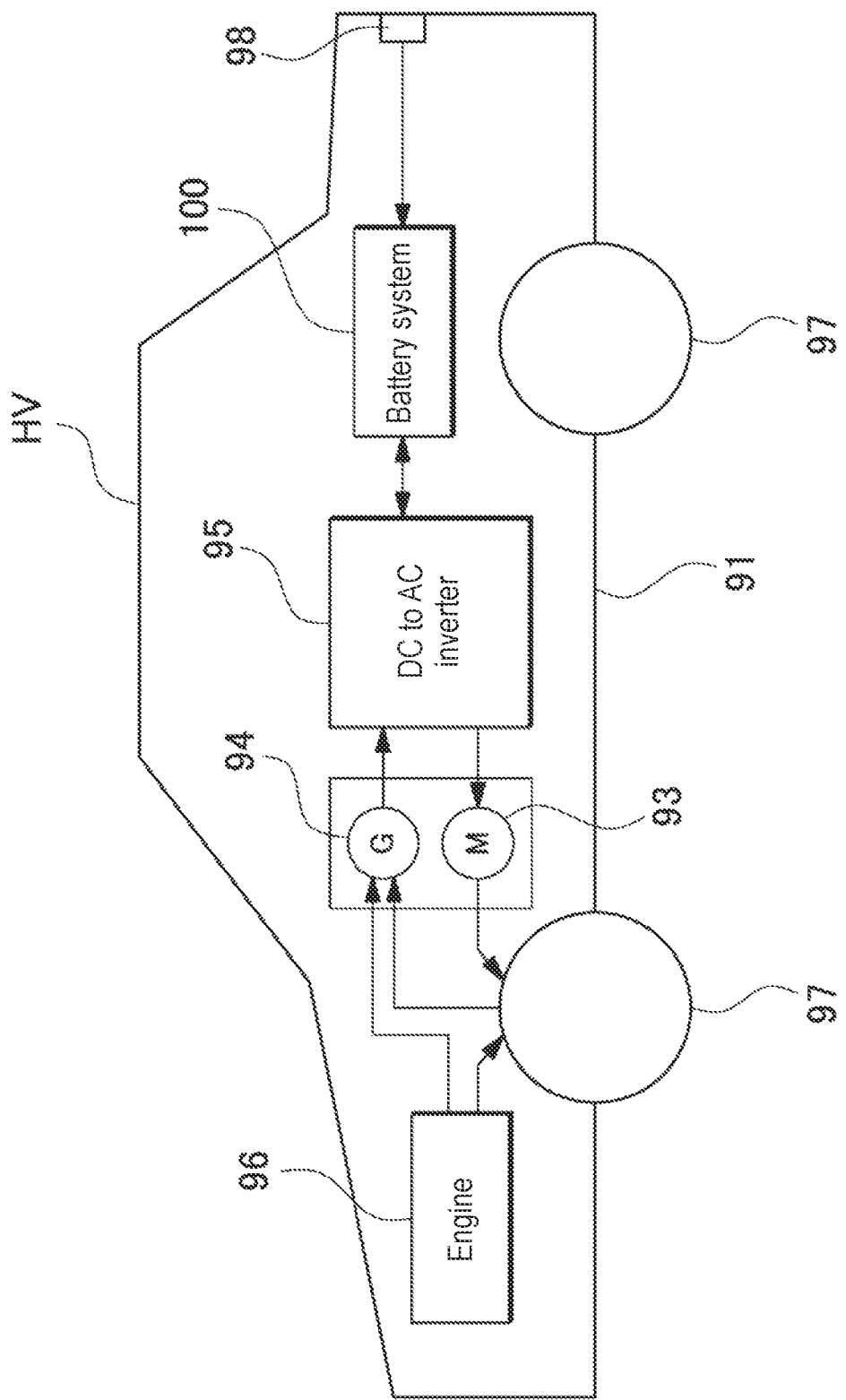
FIG. 5 is a block diagram showing an example of mounting the battery system on a hybrid vehicle that runs using an engine and a motor.

FIG. 5 shows an example in which the battery system is mounted on a hybrid vehicle that travels using both an engine and a motor. Vehicle HV shown in FIG. 5 equipped with battery system 100 includes engine 96 and traveling motor 93 that drive vehicle HV, battery system 100 for supplying electric power to motor 93, power generator 94 for charging the battery cells of battery system 100, vehicle body 91 equipped with engine 96, motor 93, battery system 100, and power generator 94, and wheels 97 that are driven by engine 96 or motor 93 to cause vehicle body 91 to travel. Battery system 100 is connected to motor 93 and power generator 94 via DC to AC inverter 95.

Vehicle HV runs using both motor 93 and engine 96 while charging and discharging the battery cells of battery system 100. Motor 93 is driven to drive the vehicle in a region where the engine efficiency is low, for example, when the vehicle is accelerating or traveling at a low speed. Motor 93 is driven by being supplied with electric power from battery system 100. Power generator 94 is driven by engine 96 or by regenerative braking when brake is applied to the vehicle, and charges the batteries of battery system 100. Further, vehicle EV shown in FIG. 5 is provided with charging plug 98, and battery system 100 can be charged by connecting charging plug 98 to an external power supply.

(Battery System for Electric Vehicle)

Figure 6:
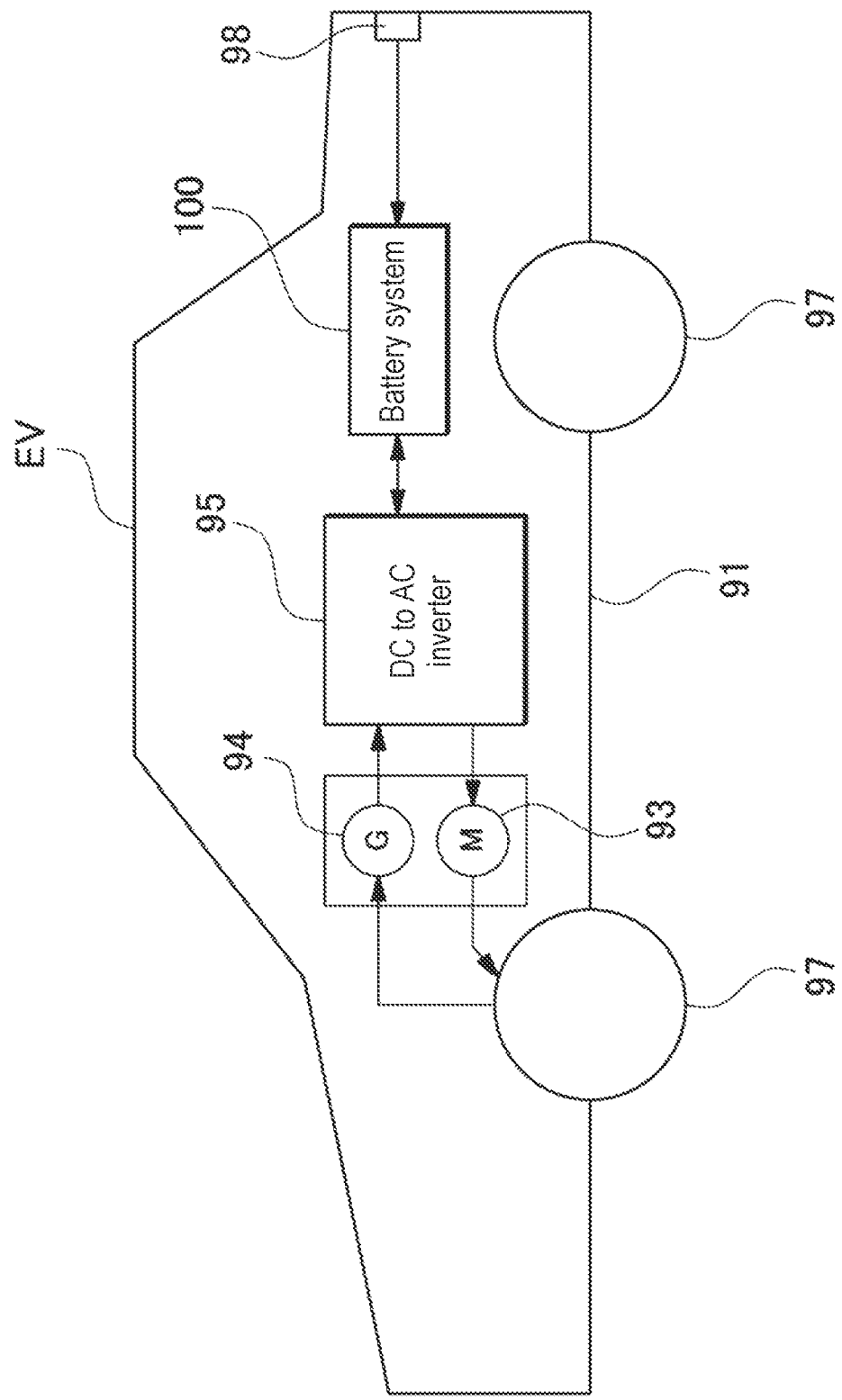
FIG. 6 is a block diagram showing an example of mounting the battery system on an electric vehicle that runs using only a motor.

FIG. 6 shows an example in which the battery system is mounted on an electric vehicle that travels using only a motor. Vehicle EV shown in FIG. 6 equipped with battery system 100 includes traveling motor 93 that drives vehicle EV, battery system 100 for supplying electric power to motor 93, power generator 94 for charging the battery cells of battery system 100, vehicle body 91 equipped with motor 93, battery system 100, and power generator 94, and wheels 97 that are driven by motor 93 to cause vehicle body 91 to travel. Battery system 100 is connected to motor 93 and power generator 94 via DC to AC inverter 95. Motor 93 is driven by being supplied with electric power from battery system 100. Power generator 94 is driven by energy generated during regenerative braking of vehicle EV, and charges the battery cells of battery system 100. Further, vehicle EV shown in FIG. 6 is provided with charging plug 98, and battery system 100 can be charged by connecting charging plug 98 to an external power supply.

(Battery System for Storage)

Figure 7:
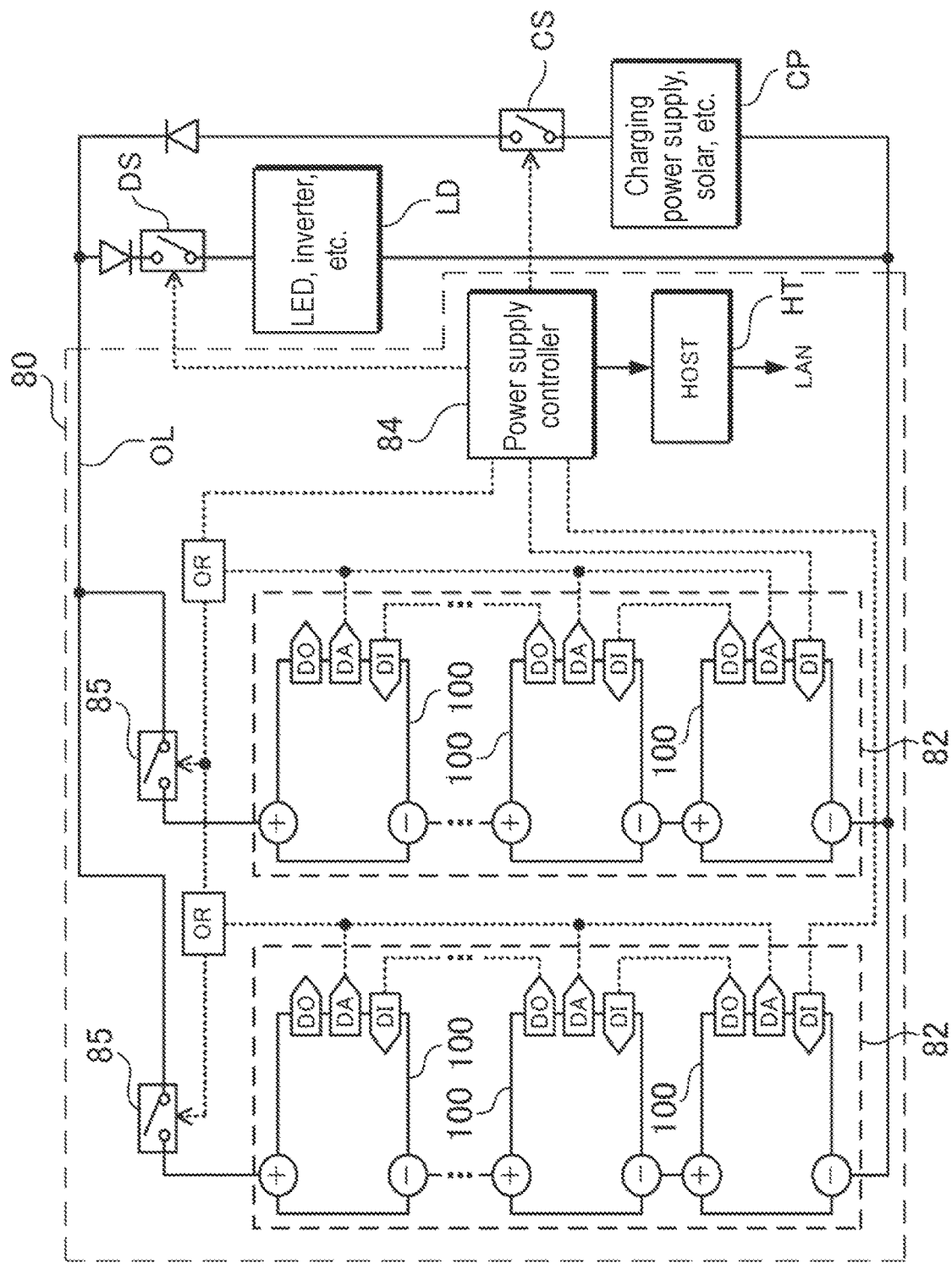
FIG. 7 is a block diagram showing an example of using the battery system for a power storage device.

Further, the present invention does not specify the use of the battery system as a battery system mounted on a vehicle. For example, the battery system can be used as a battery system for a power storage device that stores natural energy generated by, for example, solar power generation and wind power generation. The battery system can also be used for all applications for storing a large amount of electric power such as a battery system for a power storage device that stores midnight power. For example, the battery system can also be used as a power supply for households and factories, such as a power supply system that is charged with sunlight or midnight power and discharges when necessary, a power supply for street lamps that is charged with sunlight in the daytime and discharges at night, and a backup power supply for traffic lights that is driven in the event of a power outage. FIG. 7 shows such an example. FIG. 7 which shows an example of using the battery system as a power storage device shows an example in which, in order to obtain desired electric power, power storage device 80 having large capacity and high output is constructed by connecting a large number of battery systems described above in series or in parallel and additionally providing a necessary control circuit.

Power storage device 80 shown in FIG. 7 includes power supply units 82, each of which is constructed by connecting a plurality of battery systems 100 as a unit. In each battery system 100, a plurality of battery cells are connected in series and/or in parallel. Each battery system 100 is controlled by power supply controller 84. Power storage device 80 drives load LD after charging power supply units 82 with charging power supply CP. Therefore, power storage device 80 includes a charging mode and a discharging mode. Load LD and charging power supply CP are connected to power storage device 80 via discharging switch DS and charging switch CS. Discharging switch DS and charging switch CS are switched between on and off by power supply controller 84 of power storage device 80. In the charging mode, power supply controller 84 turns on charging switch CS and turns off discharging switch DS to allow charging of power storage device 80 by charging power supply CP. When charging is completed and the power storage device is fully charged, or when a request is issued from load LD in a state where the power storage device is charged to a level equal to or greater than a predetermined value, power supply controller 84 switches to the discharging mode by turning off charging switch CS and turning on discharging switch DS to allow discharge to load LD from power storage device 80. Further, if necessary, power supply controller 84 can also simultaneously perform power supply to load LD and charging of power storage device 80 by turning on charging switch CS and discharging switch DS.

Load LD driven by power storage device 80 is connected to power storage device 80 via discharging switch DS. In the discharging mode of power storage device 80, power supply controller 84 turns on discharging switch DS to connect power storage device 80 to load LD, and drives load LD with electric power from power storage device 80. A switching element such as a field-effect transistor (FET) can be used as discharging switch DS. The on and off of discharging switch DS are controlled by power supply controller 84 of power storage device 80. Power supply controller 84 also has a communication interface for communicating with an external device. In the example of FIG. 7, power supply controller 84 is connected to host device HT according to an existing communication protocol such as universal asynchronous receiver/transmitter (UART) or recommended standard 232 version C (RS-232C). Further, if necessary, a user interface for a user to operate the power supply system can be provided.

Each battery system 100 includes a signal terminal and a power supply terminal. The signal terminal includes input and output terminal DI, abnormality output terminal DA, and connection terminal DO. Input and output terminal DI is a terminal for inputting and outputting signals from and to another battery system 100 or power supply controller 84, and connection terminal DO is a terminal for inputting and outputting signals from and to another battery system 100. Abnormality output terminal DA is a terminal for outputting an abnormality of battery system 100 to the outside. Further, the power supply terminals are terminals for connecting battery systems 100 in series or in parallel. Further, power supply units 82 are connected to output line OL via parallel connection switch 85, and are connected in parallel with each other.

INDUSTRIAL APPLICABILITY

The battery system according to the present invention can be suitably used as a battery system for a plug-in hybrid electric vehicle and a hybrid electric vehicle, which can switch between an EV driving mode and an HEV driving mode, an electric vehicle, and the like. In addition, the battery system according to the present invention can also be used, as appropriate, as a backup power supply that can be mounted in a rack of a computer server, a backup power supply for wireless base stations for mobile phones, etc., a power storage device combined with a solar cell, such as a power storage power supply for households and factories or a power supply for street lamps, a backup power supply for traffic lights, and the like.

REFERENCE MARKS IN THE DRAWINGS 100 battery system
1 rectangular battery cell
2 battery stack
3 end plate
4 binding bar
4a retaining hole
5 plate
5A outer plate
5B inner plate
6 plate-shaped block
7 dual-side block
8 intermediate block
8A inclined surface
8B tip surface
9 tapered groove
9A facing surface
10 set screw
13 electrode terminal
15 separator
31 gap
32 fixing hole
33 female screw hole
41 binding bar main surface
42 upper-surface-side bent portion
43 lower-surface-side bent portion
80 power storage device
82 power supply unit
84 power supply controller
85 parallel connection switch
91 vehicle body
93 motor
94 power generator
95 DC to AC inverter
96 engine
97 wheel
98 charging plug
HV vehicle
EV vehicle
LD load
CP charging power supply
DS discharging switch
CS charging switch
OL output line
HT host device
DI input and output terminal
DA abnormality output terminal
DO connection terminal

The invention claimed is:
1. A battery system comprising:
a battery stack including a plurality of rectangular battery cells that are stacked;
a pair of end plates placed at both ends of the battery stack; and a binding bar that connects the pair of end plates together to fix the battery stack in a compressed state in a stacking direction, each of the end plates including plates placed on both surfaces of the end plate, and a plate-shaped block laminated between the plates, wherein the plates each include an outer plate placed on an outer surface among the both surfaces and an inner plate placed on an inner surface among the both surfaces, the plate-shaped block includes dual-side blocks placed on both sides and separated from each other, and an intermediate block provided in a tapered groove between the dual-side blocks, the tapered groove has a taper shape that gradually increases in width from an outside to an inside of the end plate, the intermediate block is placed in close contact with facing surfaces of the tapered groove in a slidable manner, the dual-side blocks are fixed on inner surfaces of the plates, and the intermediate block pressed by the battery stack is press-fitted into the tapered groove and applies tensile stress to the outer plate and the inner plate via the dual-side blocks.

2. The battery system according to claim 1, wherein the battery system has a gap between an inner surface of the outer plate and the intermediate block.

3. The battery system according to claim 1, wherein the tapered groove has an inclination angle α of 5 degrees or more.

4. The battery system according to claim 1, wherein the tapered groove has an inclination angle α of 45 degrees or less.

5. The battery system according to claim 1, wherein the plate-shaped block is thicker than each of the plates.

6. The battery system according to claim 1, wherein the plates and the dual-side blocks are made of metal, and the plates and the dual-side blocks are fixed by welding.

7. The battery system according to claim 1, wherein the binding bar is fixed to the plate-shaped block.

8. The battery system according to claim 1, wherein the dual-side blocks are provided with fixing holes penetrating in a vertical direction.

9. The battery system according to claim 1, wherein an opening width W of the tapered groove on a side of the inner plate is 30% or more of a total width H of each of the end plates.

10. The battery system according to claim 1, wherein each of the rectangular battery cells is a non-aqueous electrolyte secondary battery.

11. A vehicle equipped with the battery system according to claim 1, the vehicle comprising:
said battery system including:
the battery system;
a motor for traveling supplied with electric power from the battery system;
a vehicle body equipped with the battery system and the motor; and
a wheel driven by the motor to cause the vehicle body to travel.

12. A power storage device equipped with the battery system according to claim 1, the power storage device comprising:
the battery system;
a power supply controller that controls charging and discharging of the battery system, wherein the battery system enables charging of any of the plurality of rectangular battery cells power from an outside by the power supply controller, and causes charging of the plurality of rectangular battery cells.

* * * * *